United States Patent [19]

Sivertson, Jr.

[11] 3,714,645

[45] Jan. 30, 1973

[54] RATE DATA ENCODER

[75] Inventor: Wilford E. Sivertson, Jr., Yorktown, Va.

[73] Assignee: The United States of America as represented by the Administrator of the National Aeronautics and Space Administration

[22] Filed: Oct. 26, 1970

[21] Appl. No.: 84,002

[52] U.S. Cl.........340/347 AD, 235/92 R, 235/92 FQ, 235/92 T

[51] Int. Cl...............................................G06m 3/02

[58] Field of Search............235/92 FQ, 92 CC, 92 T; 340/347 AD

[56] References Cited

UNITED STATES PATENTS

| | | | |
|---|---|---|---|
| 3,062,443 | 1/1962 | Palmer | 235/92 FQ |
| 3,586,835 | 6/1971 | Foeh | 235/92 FQ |
| 3,075,189 | 1/1963 | Lisicky | 340/347 AD |

*Primary Examiner*—Maynard R. Wilbur
*Assistant Examiner*—Robert F. Gnuse
*Attorney*—Howard J. Osborn, William H. King and John R. Manning

[57] ABSTRACT

Apparatus and technique for encoding rate data. The expected range of the rate data is determined and the data falling within that range is encoded by conventional digital techniques. If the data falls either below or above the range, the encoding is stopped and signals are transmitted indicating that the data is not within the expected range.

10 Claims, 2 Drawing Figures

INVENTOR
WILFORD E. SIVERTSON, JR.

BY Howard J. Osborn
William H. King
ATTORNEYS

INVENTOR
WILFORD E. SIVERTSON, JR.

BY Howard J Osborn
William H. King
ATTORNEYS

RATE DATA ENCODER

ORIGIN OF THE INVENTION

The invention described herein was made by an employee of the United States Government and may be manufactured and used by or for The Government for governmental purposes without the payment of any royalties thereon or therefor.

BACKGROUND OF THE INVENTION

The invention relates generally to the field of encoding and specifically concerns encoding and transmitting rate data in a compressed digital form.

In aerospace technology, it is often important to monitor the rates of many instruments on board vehicles and transmit these back to earth; i.e., frequency, pulse rate, revolutions per second, events per unit of time, etc. Before data is transmitted back to earth, it is put in form of digital words or codes composed of bits in a binary number system. Each bit is then transmitted to earth and the word is decoded. The rate is not transmitted on an analog signal because of the inherent inaccuracy of such transmissions.

Previous art encoding devices receive an analog input signal proportional to the rate being monitored and converts this to a digital word composed of binary bits which represent the actual rate. Each of these bits is then transmitted to earth. A disadvantage of these devices is that when the actual rate is in binary form it often contains a large number of bits, and this makes necessary a compromise between: (a) providing sufficient equipment and time to encode and transmit so much information, or (b) reducing the resolution (accuracy) of the encoder so that less information need be transmitted. It is therefore the primary purpose of this invention to reduce the size of the digital word that must be transmitted without degrading accuracy.

SUMMARY OF THE INVENTION

The principle of this invention is that it only encodes rate information within the expected range of rate fluctuation and this is all that is transmitted. At the receiver, this rate change information is added to a reference rate. For example, suppose it were desired to monitor the pulse rate of an animal in a spacecraft. The pulse rate of this particular animal is known to usually be within the range of 250 – 300 pulses per minute. This invention would only measure and encode the rate of over 250 pulses per minute and less than 300 pulses per minute. After transmission, the encoded rate would simply be added to the reference pulse rate which, in this case, would be either 250 or 300 pulses per minute depending upon whether the encoder is set up to encode negative or positive counts relative to the reference. If the pulse rate of the animal actually falls below 250 or goes above 300, the encoder stops encoding and transmits an alarm signal which indicates whether the pulse rate is above or below the anticipated range. The encoder disclosed in the drawings only encodes 4 bits of binary information, so where the range of rate data encoded is 50, as above, the encoder can have a resolution of 50 divided by 15 or 3.3 because numbers higher than 15 cannot be encoded in 4 binary bits.

DETAILED DESCRIPTION OF THE INVENTION

Figure 1:
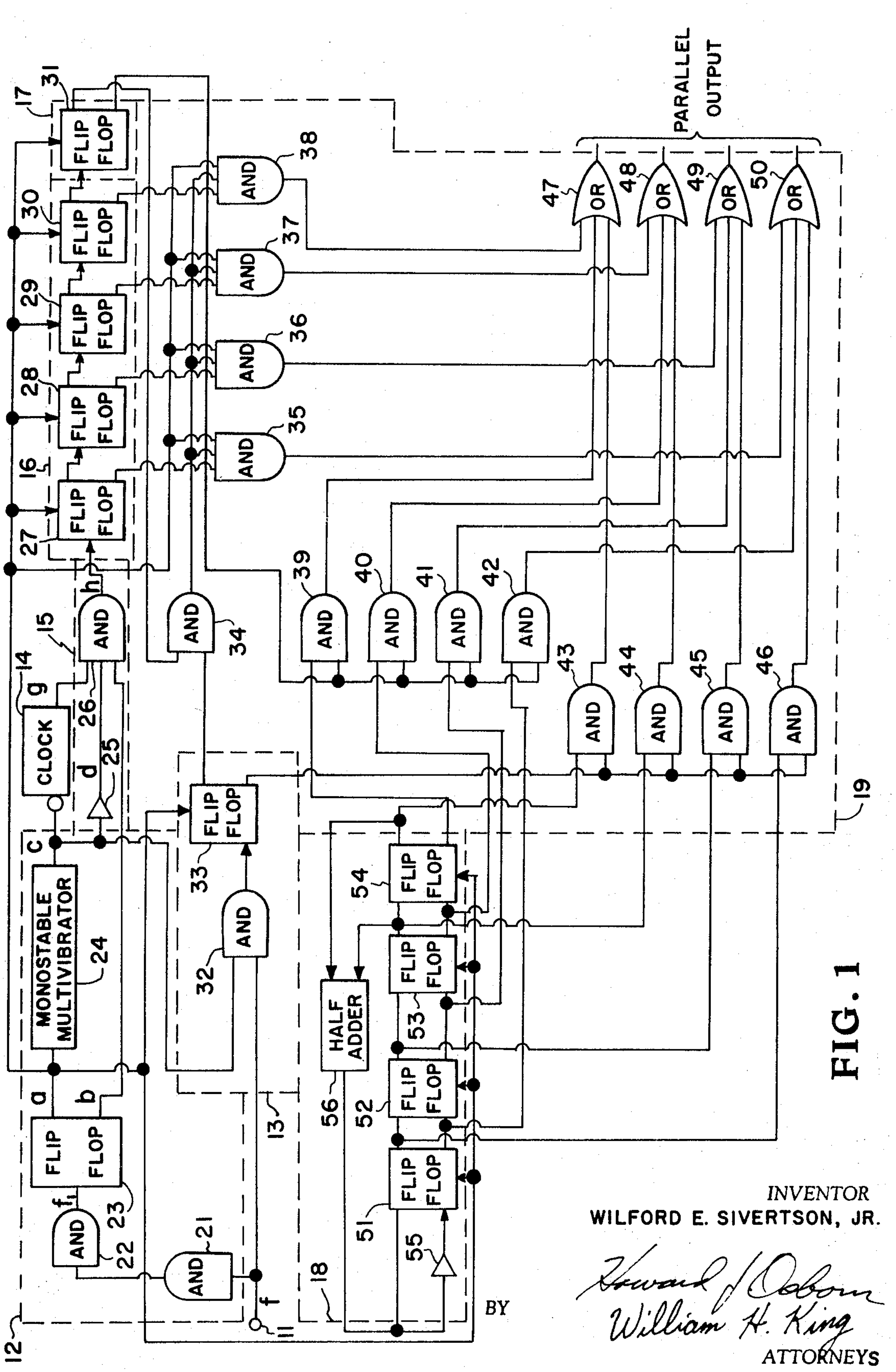
FIG. 1 is a schematic drawing of an embodiment of the invention.

Turning now to the embodiment of the invention selected for illustration in the drawings the number 11 in FIG. 1 designates the input terminal to which the input electrical pulses f, whose frequency is to be measured, are applied. The input pulses f are applied to a time bias generator 12 and to an upper range bound detector 13. Each pulse applied to time bias generator 12 causes it to generate a voltage wave *c* whose following edge occurs a length of time after the pulse equal to the reciprocal of the upper bound of the expected frequency range of pulses *f*. The following edge of voltage wave c turns on a clock 14 which generates clock pulses *g*. These clock pulses pass through a clock gate 15 until the next pulse f at which time the clock pulses are blocked. The clock pulses h passed through clock gate 15 are counted by accumulator 16. The count on accumulator 16, which is indicative of the frequency of pulses *f*, is passed in parallel form through output logic 19 to the parallel output. A pseudo-random noise generator 18 generates a first and a second signal with each being in parallel form. Upper range bound detector 13 produces a signal whenever a pulse f occurs before the following edge of voltage wave *c*. This signal is applied to output logic 19 which applies the first signal from noise generator 18 to the parallel output indicating that the frequency of pulses *f* is above the upper bound of the expected frequency. Whenever the number of clock pulses h exceeds the capacity of accumulator 16, the accumulator applies a signal to a lower range bound detector 17 which produces another signal that is applied to output logic 19. This results in the second signal from the noise generator 18 being applied to the parallel output thereby indicating that the frequency of pulses *f* has fallen below the lower bound of the expected frequency. Hence, the apparatus in FIG. 1 either encodes the frequency of pulses *f* if they have a frequency within the expected range or indicates that the frequency of pulses *f* is above or below the expected range.

Figure 2:
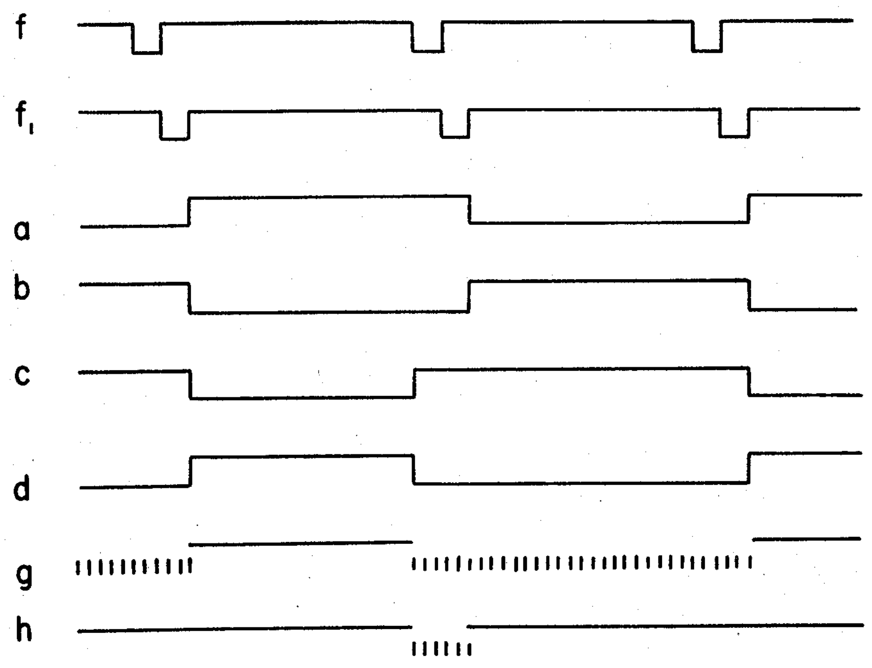
FIG. 2 discloses wave forms for the purpose of describing the operation of the embodiment of the invention disclosed in FIG. 1.

Time bias generator 12 consists of AND gates 21 and 22, a flip flop 23 and a monostable multivibrator 24. The input pulses *f* that are applied to input terminal 11 and other waveforms in FIG. 1 are shown in FIG. 2. In the waveforms in FIG. 2, the upper level voltages represent a binary "0" and the lower level voltages represent a binary '1.' The pulses f are delayed by AND gates 21 and 22. These delayed pulses are shown as pulses $f_1$ in FIG. 2. Pulses $f_1$ are applied to the trigger input of flip flop 23. Flip flop 23 is triggered by the following edges of pulses $f_1$ to produce an output *a* and its logical inverse *b* shown in FIG. 2. Output *a* is applied to monostable multivibrator 24 to produce the waveform *c*. Waveform *c* is applied to clock 14 which generates clock pulses only when *c* is at its lower level. The output of clock 14 is shown as waveform *g* in FIG. 2. Clock gate 15 consists of an inverter 25 and an AND gate 26.

Waveform *c* is applied to inverter 25 to produce its logical inverse *d* which is shown in FIG. 2. Waveforms *b* and *d*, and pulses *g* are applied to AND gate 26 which passes the pulses *g* only when both *b* and d are a binary 1. Hence, the output of AND gate 26 is pulses h which are shown in FIG. 2. Accumulator 16 consists of flip flops 27, 28, 29 and 20 connected as shown for the purpose of counting pulses *h*. The count of these pulses h appear in parallel form at the lower outputs of the four flip flops. Lower range bound detector 17 consists of a flip flop 31 with its trigger input fed by the upper output of flip flop 30. As long as the frequency of pulses *f* does not fall below the lower bound of the expected frequency range the upper output of flip flop 31 is a binary '1' and the lower output of flip flop 31 is a binary "0." However, when the frequency of pulses *f* falls below the lower bound the upper output of flip flop 31 becomes a binary "0" and the lower output of flip flop 31 becomes a binary 1' indicating that the frequency of pulses *f* has fallen below the lower range bound.

Upper range bound detector 13 consists of an AND gate 32 and a flip flop 33. The input pulses *f* and the waveform *c* are applied to the two inputs of AND gate 32. The output of AND gate 32 is connected to the reset input of flip flop 33. When flip flop 33 is reset its upper output produces a binary "0" and its lower output produces a binary '1.' Waveform *a* is applied to the set input of flip flop 33. Each time waveform *a* goes from a binary "0" to a binary '1' the flip flop is set such that its upper output produces a binary '1' and its lower output produces a binary "0." Output logic 19 consists of AND gates 34–46 and OR gates 47–50 connected as shown. Noise generator 18 consists of flip flops 51–54, an inverter 55 and a half adder 56 connected as shown. The noise indicating that the frequency of pulses *f* is below the lower bound is generated at the lower outputs of flip flops 51–54 and connected to AND gates 39–42. The noise indicating that the frequency of pulses *f* is above the upper bound is generated at the upper outputs of flip flops 51–54 and applied to AND gates 43–46. Also applied to the inputs of each of the AND gates 39–42 is the lower output of flip flop 31, and also applied to the inputs of AND gates 43–46 is the lower output of flip flop 33. The upper outputs of flip flops 31 and 33 are applied to AND gate 34 whose output is applied to AND gate 35–38. The purpose of AND gate 34 is to assure that the count on accumulator 16 is applied to the parallel output only when the frequency of the pulses *f* is within the expected range. Also applied to these AND gates are waveform a and the lower outputs of the flip flops of accumulator 16. The outputs from AND gates 35–46 are applied to OR gates 47–50 as shown.

In the operation of this invention the first *f* pulse is delayed by AND gates 21 and 22 to form the first $f_1$ pulse. The following edge of this $f_1$ pulse triggers flip flop 23 to cause its *a* output to become a binary "0" and its *b* output to become a binary 1. The *a* output at the time it goes from a binary 1 to a binary "0" is applied to flip flops 27, 28, 29, 30, 31, 33, 51, 52, 53 and 54 to set them such that their upper outputs produce a binary 1 and their lower outputs produce a binary "0." The output a of flip flop 23 is also applied to AND gates 35–38 and triggers monostable multivibrator 24 to cause it to produce voltage wave *c*. The duration of voltage wave *c* determines the upper bound of the expected frequency range. The output *c* is applied to clock 14 to stop it from generating clock pulses during the time that voltage wave *c* is at a binary 1. At all other times clock 14 is generating pulse at a constant rate. The voltage wave *g* in FIG. 2 indicates the output of clock 14. Voltage wave *c* is also applied to an inverter 25 to form voltage wave d shown in FIG. 2 and to one of the inputs of AND gate 32. Voltage waves *b, d* and *g* are applied to AND gate 15 to produce voltage wave *h*. Voltage wave *h* is a series of pulses which are counted by accumulator 16. The output of accumulator 16 is applied to AND gates 35, 36, 37 and 38 in parallel form. At the time the voltage wave a goes from a binary "0" to a binary 1 (caused by the following edge of the next $f_1$ pulse triggering flip flop 23) these AND gates apply the count on the flip flops through the OR gates 47–50 to the parallel output. In the example shown in FIG. 2 this count would be 10. Hence, if it were assumed that the range of the device was 250 to 300 pulses per minute then this count of 10 would indicate a frequency of 300 minus 10 times 3.3 which is equal to 267 pulses per minute. If the rate of *f* were less than 250 cycles per minute then the count on accumulator 16 would exceed 15 which would change the state of flip flop 31 causing the lower output of this flip flop to go from a binary "0" to a binary 1. This binary 1 is applied to AND gates 39–42 to gate the signal at the lower inputs of flip flops 51–54 through the OR gates to the parallel output thereby indicating that the frequency is below 250 pulses per minute. If the frequency is greater than 300 pulses per minute then the next *f* pulse is applied to AND gate 32 while the *c* voltage wave is a binary 1 thereby resetting flip flop 33 to a condition such that the lower output flip flop 33 is a binary 1. This binary 1 is applied to AND gates 43–46 gating the signal from the upper outputs of the flip flops 51, 52, 53 and 54 through the OR gates 47, 48, 49 and 50 to the parallel output thereby indicating that the frequency of 300 pulses per minute is being exceeded.

The advantage of this invention is that it provides an encoding technique for maintaining data accuracy and reducing the coded word length associated with sampled data. This can be used to improve transmission efficiency. In this way, time, bandwidth and power can be conserved in systems transmitting rate data.

It is to be understood that the form of the invention herewith shown and described is to be taken as a preferred embodiment. Various changes may be made in the shape, size and arrangement of parts. For example, equivalent elements may be substituted for those illustrated and described herein, parts may be reversed and certain features of the invention may be utilized independently of the use of other features, all without departing from the spirit and scope of the invention as defined in the subjoined claims. NAND or other logical circuit elements could be used instead of AND logical circuit elements. Other devices such as counters, delay lines, etc., could be used as a delay element in place of the monostable multivibrator. The signals from the noise generator 18 could be utilized to adapt the encoding to accommodate a new encoder range of operation.

What is claimed as new and desired to be secured by Letters Patent of the United States is:

1. Apparatus for receiving rate data in the form of electrical pulses per unit of time that has an expected frequency range and for encoding said rate data within said range comprising:

means including a monostable multivibrator responsive to alternate ones of said electrical pulses for generating a voltage wave whose following edge occurs a length of time after the pulse equal to the reciprocal of a bound of said frequency range;

means responsive to the following edge of said voltage wave for producing constant frequency clock pulses;

means responsive to the next of said electrical pulses for stopping the production of said clock pulses; and means for counting the produced clock pulses whereby the number of counted clock pulses is indicative of frequency of said electrical pulses.

2. Apparatus according to claim 1 wherein said bound is the upper bound of said frequency range.

3. Apparatus according to claim 2 including means responsive to said electrical pulses and said voltage wave for indicating when the frequency of said electrical pulses exceeds said upper bound.

4. Apparatus according to claim 3 wherein said means for indicating when the frequency of said electrical pulses exceed said upper bound includes a pseudo-random noise generator and gating means responsive to said electrical pulses and said voltage wave for connecting said pseudo-random noise generator to the output of said apparatus when said upper bound is exceeded.

5. Apparatus according to claim 2 including means responsive to said counting means for indicating when the frequency of said electrical pulses falls below the lower bound of said frequency range.

6. Apparatus according to claim 5 wherein said means for indicating when the frequency of said electrical pulses falls below the lower bound of said frequency range includes a pseudo-random noise generator, means for generating a signal whenever said counting means exceeds its capacity and means responsive to said signal for gating the output of said noise generator to the output of said apparatus.

7. Apparatus according to claim 6 wherein said means for generating a signal is a flip flop.

8. Apparatus according to claim 2 including a signal generator for producing a first signal and a second signal; means receiving said electrical pulses and said generated voltage waves for gating said first signal to the output of said apparatus whenever one of said electrical pulses is received before the following edge of said voltage wave occurs thereby indicating that the frequency of the electrical pulses has exceeded said upper bound; means responsive to a signal from said counting means indicating that it has received a number of pulses greater than its capacity to count for gating said second signal to the output of said apparatus thereby indicating that the frequency of the electrical pulses has fallen below said lower bound; and means for connecting the output of said counting means to the output of said apparatus whenever the frequency of said electrical pulses is within said range.

9. Apparatus according to claim 1 wherein said means for generating a voltage wave comprises a flip flop connected to receive said electrical pulses with one of the outputs from said flip flop connected to the input of said monostable multivibrator.

10. Apparatus according to claim 9 wherein said means for stopping the production of said clock pulses comprises an AND gate having a first of its inputs connected to receive said clock pulses, a second of its inputs connected to an output from said flip flop other than said one, and a third of its inputs connected through an inverter to said one of the outputs from said flip flop.

* * * * *